(12) United States Patent
Bertness et al.

(10) Patent No.: US 11,748,827 B2
(45) Date of Patent: Sep. 5, 2023

(54) ORDER FULFILLMENT SYSTEM

(71) Applicant: Marmon Foodservice Technologies, Inc., Osseo, MN (US)

(72) Inventors: Elizabeth Bertness, Batavia, IL (US); Loren Veltrop, Chicago, IL (US)

(73) Assignee: Marmon Foodservice Technologies, Inc., Osseo, MN (US)

(*) Notice: Subject to any disclaimer, the term of this patent is extended or adjusted under 35 U.S.C. 154(b) by 228 days.

(21) Appl. No.: 16/533,336

(22) Filed: Aug. 6, 2019

(65) Prior Publication Data

US 2020/0043107 A1     Feb. 6, 2020

Related U.S. Application Data

(60) Provisional application No. 62/715,087, filed on Aug. 6, 2018.

(51) Int. Cl.

| | |
|---|---|
| *G06Q 50/12* | (2012.01) |
| *G06Q 20/18* | (2012.01) |
| *G06Q 30/0601* | (2023.01) |
| *G06Q 20/32* | (2012.01) |

(Continued)

(52) U.S. Cl.
CPC ............ *G06Q 50/12* (2013.01); *G06Q 20/18* (2013.01); *G06Q 20/322* (2013.01); *G06Q 30/0621* (2013.01); *G06Q 30/0635* (2013.01); *G06K 19/06037* (2013.01); *G06K 19/0723* (2013.01)

(58) Field of Classification Search
CPC .. F04B 13/00; F04B 13/02; F04B 9/02; F04B 49/065; F04B 2201/0201; F04B 2201/0206; F04B 2201/0601; F04B 2203/1001; F04B 2205/09; F04B 43/0072; F04B 43/1133; F04B 43/1136; F04B 51/00; B01F 15/00123; B01F 15/00311; B01F 15/0441; G06F 3/0482; G06F 3/04842; G06Q 50/12; G06Q 30/0621; G06Q 20/20; G06Q 20/32; G06Q 20/322; G06Q 20/384; G06Q 20/386; G06Q 20/387; G06Q 30/02; (Continued)

(56) References Cited

U.S. PATENT DOCUMENTS

| | | | |
|---|---|---|---|
| 2,537,119 A | 1/1951 | Buerlein et al. | |
| 3,460,717 A | 8/1969 | Thomas | |
| 3,575,352 A | 4/1971 | Hall et al. | |

(Continued)

FOREIGN PATENT DOCUMENTS

| | | |
|---|---|---|
| GB | 2042351 | 9/1980 |
| GB | 2340415 | 2/2000 |

(Continued)

*Primary Examiner* — Peter Ludwig
(74) *Attorney, Agent, or Firm* — Andrus Intellectual Property Law, LLP

(57) ABSTRACT

Foodservice customer order fulfillment includes an identifier is associated to a package. A customer order of an ordered item is received at an order fulfillment system. An indication of the ordered item is stored in association to the identifier in the order fulfillment system. The identifier associated to the package is read at a reader associated with a dispenser of at least one ingredient. The identifier is communicated from the reader to the order fulfillment system. A dispenser receives a dispense instruction from the order fulfillment system and operates to dispense at least one ingredient.

20 Claims, 4 Drawing Sheets

(51) Int. Cl.
  *G06K 19/07* (2006.01)
  *G06K 19/06* (2006.01)

(58) Field of Classification Search
  CPC .............. G06Q 30/06; G06Q 30/0631; G06Q 30/0635; G06Q 30/0641; G06Q 30/0643
  See application file for complete search history.

(56) References Cited

U.S. PATENT DOCUMENTS

| | | | |
|---|---|---|---|
| 4,218,014 A | 8/1980 | Tracy | |
| 4,635,825 A | 1/1987 | Tulasne | |
| 4,708,266 A | 11/1987 | Rudick | |
| 4,753,370 A | 6/1988 | Rudick | |
| 4,792,402 A | 12/1988 | Fricker | |
| 4,928,854 A | 5/1990 | McCann et al. | |
| 4,967,932 A | 11/1990 | Wiley et al. | |
| 5,025,840 A | 6/1991 | Tacke | |
| 5,033,651 A | 7/1991 | Whigham et al. | |
| 5,102,016 A | 4/1992 | Ball et al. | |
| 5,203,474 A | 4/1993 | Haynes | |
| 5,308,631 A | 5/1994 | Anglerot | |
| 5,366,117 A | 11/1994 | Mesenbring et al. | |
| 5,415,326 A | 5/1995 | Durham et al. | |
| 5,429,681 A | 7/1995 | Mesenbring | |
| 5,435,466 A | 7/1995 | Du | |
| 5,549,222 A | 8/1996 | Schroeder | |
| 5,566,863 A | 10/1996 | Mesenbring et al. | |
| 5,570,822 A | 11/1996 | Lemarbe et al. | |
| 5,649,644 A | 7/1997 | Hashimoto et al. | |
| 5,799,832 A | 9/1998 | Mayo | |
| 6,003,733 A | 12/1999 | Wheeler | |
| 6,016,935 A | 1/2000 | Huegerich et al. | |
| 6,047,859 A | 4/2000 | Schroeder et al. | |
| 6,095,371 A | 8/2000 | Mooney | |
| 6,189,736 B1 | 2/2001 | Phallen et al. | |
| 6,220,047 B1 | 4/2001 | Vogel et al. | |
| 6,227,420 B1 | 5/2001 | Jepson | |
| 6,253,963 B1 | 7/2001 | Tachibana | |
| 6,328,229 B1 | 12/2001 | Duronio et al. | |
| 6,345,729 B1 | 2/2002 | Santy | |
| 6,357,632 B1 | 3/2002 | Salmela | |
| 6,390,662 B1 | 5/2002 | Henry et al. | |
| 6,481,645 B1 | 11/2002 | Taylor-McCune et al. | |
| 6,689,410 B2 | 2/2004 | Gerber | |
| 6,698,229 B2 | 3/2004 | Renken et al. | |
| 6,719,175 B2 | 4/2004 | Mackenzie et al. | |
| 6,722,530 B1 | 4/2004 | King et al. | |
| 6,739,524 B2 | 5/2004 | Taylor-McCune et al. | |
| 6,745,592 B1 | 6/2004 | Edrington et al. | |
| 6,871,761 B2 | 3/2005 | Fox | |
| 7,059,761 B2 | 6/2006 | Gerber | |
| 7,159,743 B2 | 1/2007 | Brandt et al. | |
| 7,243,818 B2 | 7/2007 | Jones | |
| 7,337,920 B2 | 3/2008 | Duck et al. | |
| 7,439,859 B2* | 10/2008 | Humphrey | G06Q 20/105 222/1 |
| 7,445,133 B2 | 11/2008 | Ludovissie et al. | |
| 7,487,887 B2 | 2/2009 | Ziesel | |
| 7,559,346 B2 | 7/2009 | Herrick et al. | |
| 7,717,297 B2 | 5/2010 | Kadyk et al. | |
| 7,757,896 B2 | 7/2010 | Carpenter et al. | |
| 7,878,370 B2 | 2/2011 | Sevcik et al. | |
| 7,997,448 B1 | 8/2011 | Leyva | |
| 8,091,737 B2 | 1/2012 | Smeller et al. | |
| 8,113,386 B2 | 2/2012 | Herrick et al. | |
| 8,167,173 B1 | 5/2012 | Simmonds et al. | |
| 8,245,629 B2 | 8/2012 | Little | |
| 8,322,570 B2 | 12/2012 | Beavis et al. | |
| 8,490,829 B2 | 7/2013 | Deo et al. | |
| 8,561,841 B2 | 10/2013 | Erman et al. | |
| 8,584,900 B2 | 11/2013 | Metropulos et al. | |
| 8,622,257 B2 | 1/2014 | Erman et al. | |
| 8,631,974 B2 | 1/2014 | Piatnik et al. | |
| 8,739,840 B2* | 6/2014 | Mattos, Jr. | B67D 1/124 141/94 |
| 8,763,918 B2* | 7/2014 | Lillard, Jr. | G06F 16/284 235/494 |
| 8,798,799 B2 | 8/2014 | Deo et al. | |
| 8,839,989 B2 | 9/2014 | Beavis et al. | |
| 8,893,927 B2 | 11/2014 | Olson et al. | |
| 8,899,280 B2 | 12/2014 | Deo et al. | |
| 9,026,245 B2 | 5/2015 | Tilton et al. | |
| RE46,143 E | 9/2016 | Erman et al. | |
| 9,622,615 B2 | 4/2017 | Hecht et al. | |
| 9,670,047 B2* | 6/2017 | Carpenter | B67D 1/0041 |
| 9,708,170 B2* | 7/2017 | Segiet | G07F 13/10 |
| 10,433,668 B2* | 10/2019 | Merali | A47J 31/404 |
| 10,899,595 B2* | 1/2021 | Cuppari | G06Q 30/0201 |
| 2002/0083730 A1 | 7/2002 | Giroux et al. | |
| 2003/0161923 A1 | 8/2003 | Holland et al. | |
| 2004/0140013 A1* | 7/2004 | Yacko | B67D 7/348 141/94 |
| 2004/0159676 A1 | 8/2004 | Adema | |
| 2005/0051577 A1 | 3/2005 | Loeb et al. | |
| 2005/0067433 A1 | 3/2005 | Brandt et al. | |
| 2005/0087255 A1* | 4/2005 | Humphrey | B67D 1/1236 141/94 |
| 2006/0157504 A1 | 7/2006 | Barket et al. | |
| 2006/0196886 A1 | 9/2006 | Fox | |
| 2008/0041876 A1 | 2/2008 | Frank et al. | |
| 2008/0073376 A1 | 3/2008 | Gist et al. | |
| 2008/0083780 A1 | 4/2008 | Romanyszyn et al. | |
| 2008/0314918 A1 | 12/2008 | Nuriely | |
| 2009/0001177 A1* | 1/2009 | Smith | G06Q 20/28 235/494 |
| 2009/0095771 A1 | 4/2009 | Hoover | |
| 2009/0120958 A1 | 5/2009 | Landers et al. | |
| 2009/0230149 A1 | 9/2009 | Smeller et al. | |
| 2010/0125362 A1* | 5/2010 | Canora | G07F 9/00 700/236 |
| 2010/0147875 A1 | 6/2010 | Santos et al. | |
| 2011/0264285 A1 | 10/2011 | Mattos et al. | |
| 2012/0126034 A1 | 5/2012 | Nolen et al. | |
| 2012/0285329 A1 | 11/2012 | Verhoeven et al. | |
| 2013/0096715 A1 | 4/2013 | Chung et al. | |
| 2013/0177261 A1 | 7/2013 | Bushnaw | |
| 2013/0200103 A1 | 8/2013 | Gates | |
| 2013/0206793 A1 | 8/2013 | Minica et al. | |
| 2013/0282169 A1 | 10/2013 | Moore et al. | |
| 2014/0069953 A1 | 3/2014 | Metropulos et al. | |
| 2014/0081777 A1* | 3/2014 | Mastrodonato | G06Q 30/0621 705/15 |
| 2014/0114469 A1 | 4/2014 | Givens et al. | |
| 2014/0324607 A1* | 10/2014 | Frehn | G06Q 50/12 705/15 |
| 2014/0372233 A1 | 12/2014 | Knecht et al. | |
| 2015/0017297 A1 | 1/2015 | Vastardis et al. | |
| 2015/0046877 A1* | 2/2015 | Cuppari | G06Q 20/322 715/834 |
| 2015/0290795 A1* | 10/2015 | Oleynik | B25J 9/0081 700/257 |
| 2016/0068383 A1* | 3/2016 | Falco, III | B67D 1/0888 222/1 |
| 2016/0229675 A1 | 8/2016 | Popov et al. | |
| 2016/0332176 A1 | 11/2016 | Mastro et al. | |
| 2017/0119199 A1 | 5/2017 | Williston et al. | |
| 2017/0122444 A1 | 5/2017 | Wilson et al. | |
| 2017/0122449 A1 | 5/2017 | Wilson et al. | |
| 2017/0122450 A1 | 5/2017 | Wilson et al. | |
| 2017/0122451 A1 | 5/2017 | Wilson et al. | |
| 2017/0123509 A1 | 5/2017 | Erman et al. | |
| 2017/0186110 A1* | 6/2017 | Carpenter | G06Q 50/12 |
| 2017/0190554 A1 | 7/2017 | Dahlberg et al. | |
| 2018/0072555 A1* | 3/2018 | Fortunato | G06Q 20/3274 |
| 2018/0253805 A1* | 9/2018 | Kelly | G06Q 20/322 |
| 2018/0290874 A1* | 10/2018 | Roberts | G07F 13/065 |
| 2018/0338504 A1* | 11/2018 | Lavri | A21C 9/04 |
| 2018/0368558 A1* | 12/2018 | Park | B01F 35/71795 |
| 2019/0359470 A1* | 11/2019 | Joshi | G07F 9/026 |
| 2021/0221667 A1* | 7/2021 | Venkatakrishnan | B67D 1/0079 |
| 2022/0033242 A1* | 2/2022 | Zubarik | G07F 13/06 |

(56) References Cited

U.S. PATENT DOCUMENTS

FOREIGN PATENT DOCUMENTS

| WO | 9927070 | 6/1999 |
| WO | 2007087611 | 8/2007 |
| WO | 2012135917 | 10/2012 |
| WO | 2014062915 | 4/2014 |
| WO | 2014151946 | 9/2014 |

* cited by examiner

ORDER FULFILLMENT SYSTEM

CROSS-REFERENCE TO RELATED APPLICATIONS

The present application claims priority of U.S. Provisional Patent Application No. 62/715,087, filed on Aug. 6, 2018, the contents of which is hereby incorporated by reference in its entirety.

BACKGROUND

The present disclosure relates to the field of packaging and dispensing of food items. More specifically, the present disclosure relates to the coordination between dispensing systems, the communication of customer orders to the dispensing systems and coordination of the product packaging with the preparation of an associated food product and quality control/verification of fulfillment of customer orders.

Many restaurant and foodservice settings, particularly quick-service restaurants (QSR) use a combination of pre-prepared and on-demand prepared food constituents in order to assemble food and beverage orders from customers. Customer orders may include a variety of order components that include, but are not limited to, hamburgers, sandwiches, French fries, beverages, custom drinks, and specialty desserts.

Additionally, as the number of menu options and accommodations of customers' special requests or customizations proliferate, management of a great number and variety of order ingredients is needed. Management of prepared food or beverage ingredients inventory is more challenging as the number of food or beverage ingredients increases. Also, as order assembly becomes more complicated, the assembly instructions are harder for food preparation workers to remember and correctly follow and further create a great learning curve for new or inexperienced workers for the introduction of new menu items. Finally, while food item packaging is supposed to improve product delivery and customer personalization, this frequently becomes an added source of complexity with numerous packaging types and potential for error between the packaging and the food contained therein. With all of these options and resulting assembly steps, chances are increased for one or more steps in the assembly of a customers' order to be missed. Therefore, it is desirable to have further systems and methods whereby the physical packaging and assembled food product can be connected and verified relative to an associated customer order.

BRIEF DISCLOSURE

In methods of foodservice customer order fulfillment, an identifier is associated with a package. A customer order of an ordered item is received at an order fulfillment system. An indication of the ordered item is stored in association with the identifier in the order fulfillment system. The identifier associated with the package is read at a reader associated with a dispenser of at least one ingredient. The identifier is communicated from the reader to the order fulfillment system. A dispense instruction is received by the dispenser from the order fulfillment system. The dispenser operates according to the dispense instruction to dispense at least one ingredient.

In further examples of methods of foodservice customer order fulfillment, the ordered item includes a plurality of ingredients and the indication of the ordered item stored in the order fulfillment system includes an identification of each of the plurality of ingredients. The order fulfillment system may track the completion of the assembly of the ordered item against the identification of each of the plurality of ingredients in the order fulfillment system. A communication from the dispenser to the order fulfillment system may indicate that the at least one ingredient has been dispensed by the dispenser. The indication of the dispense of at least one ingredient may be stored at the order fulfillment system. The order fulfillment system may determine if the at least one ingredient of the dispenser associated with the reader has dispensed in this assembly of the ordered item by referencing the tracked completion of the ordered item assembly. If the ingredient has not been dispensed, then the order fulfillment system confirms the dispense instruction to the dispenser. If the ingredient has been dispensed, the order fulfillment system initiates production of a perceptible notification. The order fulfillment system may verify if assembly of the ordered item is complete by reference to the tracked completion of the ordered item assembly. If the ordered item is not verified as complete, then the order fulfillment system may initiate production of a perceptible notification of a next remaining ingredient to be dispensed to complete the assembly of the ordered item. If the ordered item is verified as complete, then the order fulfillment system may initiate production of a perceptible notification to a customer that the ordered item is complete. Payment may be obtained from the customer for the ordered item after the perceptible notification to the customer that the ordered item is complete. The received customer order may identify the ordered item and the order fulfillment system may identify the plurality of ingredients of the ordered item.

In further examples of methods of foodservice customer order fulfillment, the customer order may be received by the order fulfillment system from a mobile device operated by the customer in communicative connection to the order fulfillment system. The package may be a reusable package with the identifier and the method further includes receiving a change to the ordered item associated with the identifier stored at the order fulfillment system. The identifier may be represented on the package as a quick response code. The identifier may be represented on the package as an RFID tag. The dispenser may dispense at least one of creamer, sugar, or flavoring. The dispenser may dispense and toast baked goods. The dispenser may dispense a plurality of sauces. The dispenser may be one dispenser of a plurality of dispensers within a dispensing system and each dispenser of the plurality of dispensers is associated with a reader communicatively connected to the order fulfillment system. The plurality of dispensers of the dispensing system may include at least one of a sauce dispenser, a produce dispenser, a beverage component dispenser, or a toasted baked good dispenser.

DETAILED DISCLOSURE

Figure 1:
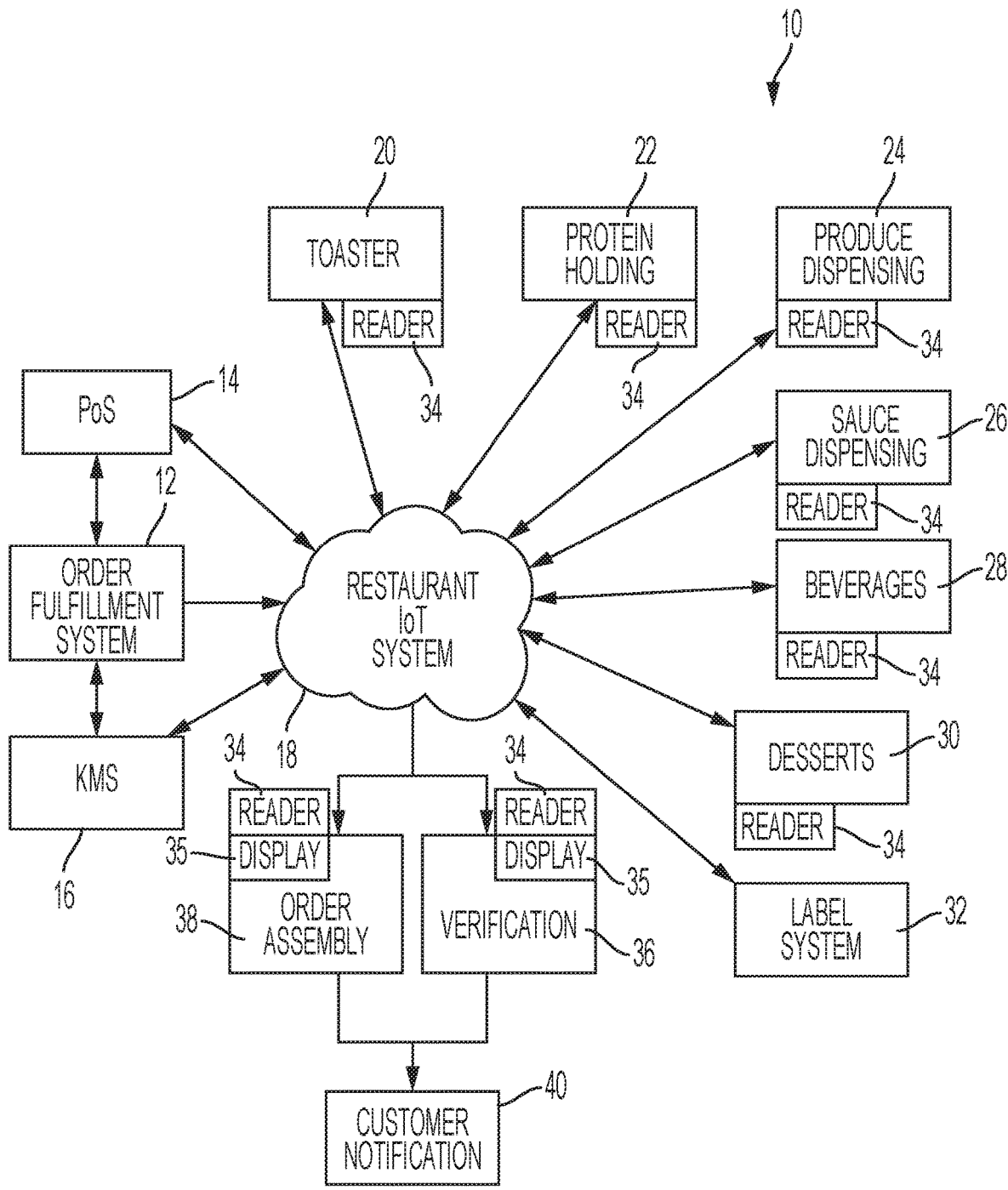
FIG. 1 depicts an example of a dispensing system.

FIG. 1 depicts a dispensing system 10. It will be recognized that the dispensing system 10 depicted in FIG. 1 is schematic and for exemplary purposes and other devices or systems as will be recognized by a person of ordinary skill in the art that may exist within a dispensing system 10 as described herein may also be used in accordance with the present disclosure. While the dispensing system 10 includes a variety of components, it will be recognized that other implementations may include more or fewer dispensers as disclosed herein. While some examples may use a single dispenser, other examples may include all of the dispensers in a kitchen. The dispensing system 10 includes an order fulfillment system 12. It will be recognized that in exemplary embodiments, the order fulfillment system 12 exemplarily coordinates communication between other devices within the kitchen and/or other information systems within the kitchen, some of which may be located locally to the kitchen or may be located remotely and accessible through a cloud computing configuration or arrangement. The order fulfillment system 12 exemplarily coordinates with a point-of-sale (POS) system 14 which operates to receive customer orders for example through a cashier, a self-serve kiosk, or an online ordering system. The order fulfillment system 12 receives customer orders from the POS system 14. The order fulfillment system 12 controls, through information management and data communication systems, the documentation of the order. As described herein, the order fulfillment system 12 operates to provide instructions to, monitor, and verify customer order completion and delivery. The order fulfillment system 12 also coordinates with a kitchen management system (KMS) 16. The KMS 16 may operate to track the inventory and use of foods and supplies within the kitchen. While the order fulfillment system 12, POS system 14, and KMS 16 have been depicted as separate components, it will be recognized that in some embodiments these components may be configured individually or may operate as a single computer/software system.

The order fulfillment system 12, POS system 14, and the KMS 16 may exemplarily be implemented with one or more central processing unit (CPU) and integrated memory in the form of a computer-readable medium (CRM), although in embodiments the computer-readable medium comprising the memory may be a separate component or communicatively connected to the CPU. The one or more CPUs implementing the order fulfillment system 12, POS system 14, and KMS 16 each exemplarily include a processor that accesses software or firmware in the form of computer-readable code stored on the non-transient computer-readable medium as either integrated memory or external memory. The processor executes the computer-readable code as an instruction set to carry out the functions as described herein, including the receipt of inputs, calculations, and outputs as will be described.

The order fulfillment system 12 is exemplarily communicatively connected to the other devices of the dispensing system 10 through a restaurant internet-of-things (IoT) communication system 18. The restaurant IoT communication system 18 is exemplarily a wireless communication system that includes at least a portion of the system local to the restaurant to facilitate bi-directional communication between the order fulfillment system 12 and the devices of the dispensing system 10, as will be described in further detail herein. In a non-limiting embodiment, the restaurant IoT communication system 18 includes a gateway that serves as a hub through which communications to the devices are collected and distributed. With the gateway located local to the kitchen, other components of the restaurant IoT communication system 18, the order fulfillment system 12, the POS system 14, and the KMS 16 may be located remotely, for example in a cloud computing implemented arrangement. As noted above, it will be recognized that the functionality of the restaurant IoT communication system 18 can be combined with one or more of the order fulfillment system 12, the POS system 14, and the KMS 16 provided the communicative connections to the other devices of the kitchen system are established and maintained.

The dispensing system 10 exemplarily includes a plurality of kitchen devices that operate to treat, hold, or dispense particular steps or constituents of the preparation of a component of a customer order. These kitchen devices may include but are not limited to a toaster 20. The toaster 20 exemplarily operates to treat a bread product, for example, a roll or bun with heat to toast or brown the bread product. Examples of toasters and bun dispensers are provided in further detail in U.S. Patent Application Publication No. 2019/0167040, entitled "Baked Good Handling System", which is hereby incorporated herein by reference in its entirety. Protein holding 22 operates to maintain environmental conditions surrounding a cooked protein in order to maintain stasis and prolong flavor, texture, and palatability. Produce dispensing 24 dispenses cut produce such as lettuce, tomatoes, onions, or pickles. Sauce dispensing 26 dispenses sauces, for example, ketchup, mustard, mayonnaise, or other specialty sauces or flavored sauces. Co-pending US Patent Application Publication No. 2018/0072555 discloses various types of sauce dispensers and systems for communication therewith and is incorporated by reference herein in its entirety. Beverage dispensing 28 can include the dispense of pre-mix or post-mix soft drinks, milk, or juice, but may also include the dispense of flavored or specialty drinks, including custom flavored or prepared coffee or tea drinks. In embodiments, the beverage dispensing may include a single device for dispensing beverages, or may be a plurality of devices that each dispense a component of a beverage (e.g. creamer dispenser, flavoring dispenser, sugar dispenser, coffee dispenser, etc.), additional disclosure of which is exemplarily provided in U.S. application Ser. No. 16/381,437, entitled "Sugar Dispenser with Auger" and which is hereby incorporated by reference in its entirety. As disclosed in the above-referenced patent application, the dispenser may not dispense the primary substance (e.g. coffee) but rather only dispense additives or flavorings (e.g. creamer, flavoring, sugar) to which the primary substance is combined. Similarly, dessert dispensing 30 exemplarily includes mixed or blended ice cream, yogurt, parfait, mousse desserts or sundaes to which any of a variety of toppings (e.g. sauces) or custom mix-ins (e.g. fruit, candy bits, nuts) are added.

The order fulfillment system 12 is further communicatively connected to a label system 32. As described herein, the label system 32 may take a variety of forms. In some examples, the label system 32 may produce a custom label that is applied to the packaging (for example as a sticker or printed on the packaging), or to a component associated with the packaging (e.g. a cup lid, or a cup insulative sleeve). The custom label may include a customer identification, an order identification, an order recipe and preparation instructions encoded in, for example, a bar code, two-dimensional bar code, a picture, a symbol, a pattern of colors, or another manner of encoding information.

In another example, the label serves a purpose of individually identifying the packaging, but does not itself encode any order instructions. In such an embodiment a supply of serialized packages are provided in the kitchen system, for example, each with encoded identification numbers. The encoding of the identification numbers may be in a bar code, two-dimensional bar code, a picture, symbol, a pattern of colors, an RFID tag, magnetic ink, or another manner of encoding information. When an order is received, the order fulfillment system 12 assigns each component of the customer's order to an individually identified package. In this embodiment, the customer identification, the order identification, the order recipe, and preparation instructions may be stored in a manner associated with the package identification at the order fulfillment system 12.

Each of the kitchen devices includes a reader 34. The reader 34 is of a type and construction configured to read the labels applied to the packaging by the label system 32. The reader 34 may be an optical sensor. The optical sensor may use coherent or incoherent light in the infra-red or visible light spectrums. The optical sensor can thus detect the pattern in a one-dimensional or two-dimensional bar code. The reader may be an electrical circuit that either includes RF communications to read a label that is an RFID tag or to detect a change in a magnetic field surrounding a magnetically encoded label. In still further examples, the reader 34 is a computer vision system with a camera that captures an image of the label and processes the image to isolate and interpret the information on the label. Such information may be alpha-numeric, a bar code, or a picture, a symbol, or a pattern of colors. As explained in further detail herein, the reader 34 obtains the information from the label on the packaging and provides it to the kitchen device for further control of the kitchen device.

It will be recognized based upon the disclosure of the present application that combinations between the two embodiments as described above may be used wherein portions of the customer identification, the order identification, the order recipe, and preparation instructions may be stored at the order fulfillment system 12 while other portions of this information is encoded in at the label on the package.

Figure 2:
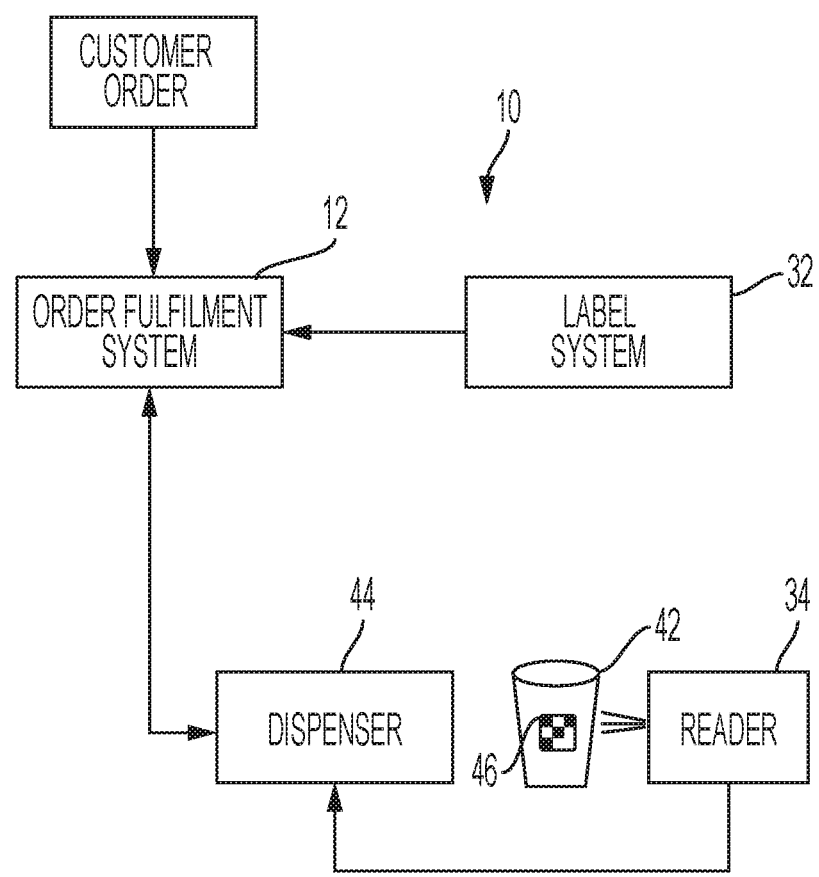
FIG. 2 depicts an example of use of the dispensing system.

FIG. 2 depicts an example of the use of a dispensing system 10 that includes an order fulfillment system 12. The order fulfillment system 12 receives a customer order, for example from the POS system, if one is not integrated already with the order fulfillment system 12. There is an associated product package 42. The product package 42 may be a cup, a box, a wrap, or another container in which the customers' order is contained. Next, there is a dispenser 44 which is any of a variety of dispensers, examples of which are provided above. The examples of the use of dispensing system 10 and order fulfillment systems 12 between FIGS. 2 and 3 exemplarily differ in the interaction between the order fulfillment system 12, the dispenser 44, and the label system 32. The label system 32 provides for the correlation between the product package and the customer order in the order fulfillment system 12. In the example depicted in FIG. 2, the label system 32 operates to provide or to coordinate a unique identifier 46 for each of the product packages 42. In the example given herein, the product package 42 will be a cup. The product packages 42 may be provided as a sequenced stack with preprinted identifiers 46 in the form of bar codes or two-dimensional bar codes, but may also be RFID tags, or other identifiers. Each of these identifiers 46 encode a unique identification number or alphanumeric string that identifies a specific product package 42 used in this system. The order fulfillment system 12 receives this information from the label system 32 and associates the identifier 46 with a particular package 42 and component of a customer's order.

The label system 32 may be carried out in a variety of manners. The product packages 42 may be preprinted or pre-provided with the identification label and the label system 32 may be a reader through which the food service worker associates the identification label of the package to a customer order component. In another example, the label system 32 may be a dispenser of the product packages and may either read the identifier of the product package and provide this information to the order fulfillment system 12 as each product package is dispensed or may have the identification number of the product packages already pre-stored in a memory of the label system 32 and provide this information to the order fulfillment system 12 upon the dispense of each subsequent product package 42. The label system 32 may print either directly onto the package or onto a label which is then affixed onto the product package 42 to provide the package 42 with the unique identifier. The label system 32 may further dispense RFID, magnetically encoded, or pre-printed labels with the unique identifier, for securement to the product packaging. At the same time that the unique identifier, is applied to the product package 42, the label system 32 provides this information to the order fulfillment system 12.

In any of these embodiments, the label system 32 and the order fulfillment system 12 coordinate to provide the result of a product package 42 with a unique identifier, the identifier, or the identification number encoded by the identifier is stored in the order fulfillment system 12 in association with a particular component with a customer order. The order fulfillment system 12 includes the recipe and the steps and/or constituents of each component of the customer order. In a non-limiting example, the component of the customer order may be a flavored coffee drink that requires, for example, one portion of vanilla flavoring, one portion of caramel flavoring, one portion of sugar, and two portions of cream. The order fulfillment system 12 stores each of these recipe components in association with an identification of this component of the customer's order. The unique identifier of the product package 42 is assigned to this component of the customer's order and further associated with the customer's order as a whole.

In use, the food service worker may take the product package 42 with the unique identifier 46 to a dispenser 44 in the kitchen. By the way of example, the dispenser 44 may be a flavoring dispenser or any of the other dispensers as described above with respect to FIG. 1. The food service worker enables the unique identifier 46 to be read by a reader 34. The reader 34 is of a type coordinated to the unique identifier such that it is able to read the unique identifier 46 on the product package 42.

Upon reading the unique identifier 46 this information is provided from the reader 34 to the dispenser 44, and more particularly to a controller (not depicted) of the dispenser 44, the controller is exemplarily a microcontroller or a microprocessor that would be recognized by a person of ordinary skill in the art to access and execute computer-readable code which, upon execution by the controller, causes the controller to send and receive data and to provide control commands to other components of the dispenser 44 in order to carry out the function as described in further detail herein. The dispenser 44, having received the encoded unique identifier of the product package 42, provides the encoded information from the unique identifier through a communicative connection to the order fulfillment system 12. The order fulfillment system 12 accesses the stored instructions for the associated order component and provides the instructions back to the dispenser 44 for the dispenser 44 to dispense one portion of vanilla flavoring and one portion of caramel flavoring into the product package 42. The dispenser 44 provides a communication back to the order fulfillment system 12 confirming when these steps have been performed and the order fulfillment system 12 updates the order component record to reflect that the steps have been completed.

Next, the food service worker moves the product package 42 to the reader 34 associated with the sugar dispenser 44. In the same manner, as described above, upon the reader 34 determining the information encoded by the unique identifier 46 of the product package 42, the sugar dispenser 44 communicates with the order fulfillment system 12 to receive the instructions for the sugar dispense step in preparing this component of the customer order. The dispenser 44 then returns an indication to the order fulfillment system 12 that the sugar dispensing step has been completed and the order fulfillment system 12 updates the order component record accordingly.

Continuing with this example, should be food service worker, by accident, return to the flavoring dispenser 44, upon the reader 34 determining the information encoded by the unique identifier 46 associated with the product package 42, the order fulfillment system 12 would provide the dispenser 44 with an indication that the flavoring additive steps have already been performed. This may be provided to the food service worker in an audible or visual communication. The dispenser 44 will not operate to dispense the flavoring as that step had already been performed. In embodiments, the audible or visual communication to the foodservice worker may then recommend a next step, in this example adding creamer, to work towards completion of the order component.

Upon the food service worker moving the product package 42 to the reader 34 associated with the creamer dispenser 44, the reader 34 determines the information encoded by the unique identifier 46 and communicates this to the creamer dispenser 44 which, in communication with the order fulfillment system 12 as described above, receives the instructions for the dispense of creamer into the product package 42 and the dispenser 44 operates to fulfill this dispense. The dispenser 44 provides communication back to the order fulfillment system 12 indicating that the creamer has been dispensed into the product package 42 and the order fulfillment system 12 updates the customer order component record accordingly.

While the example of the use of the dispensing system 10 depicted in FIG. 2 has been described with respect to an example in which the order component is prepared by the sequential use of a plurality of dispenser devices, in an alternative example, a single dispenser capable of dispensing multiple types of component constituents, for example, a combined dispenser of flavorings, sugar, and creamer. In such an example, the unique identifier 46 may only need to be determined once by a reader associated with this combined dispenser and the order fulfillment system 12 may provide the instructions for all of the operations of the combined dispenser to dispense into the product package 42.

When the dispensing system 10 is implemented with a dispenser 44 that is capable of performing multiple functions, a user may only need to interact with a single dispenser 44 to complete the customer order. Rather than moving the packaging 42 to multiple dispensers 44, the packaging 42 may remain at a single multi-function dispenser 44. Upon scanning the identifier with the reader 34, the dispenser 44 receives a plurality of dispensing instruction from the order fulfillment system or stored locally to the dispenser 44.

Figure 3:
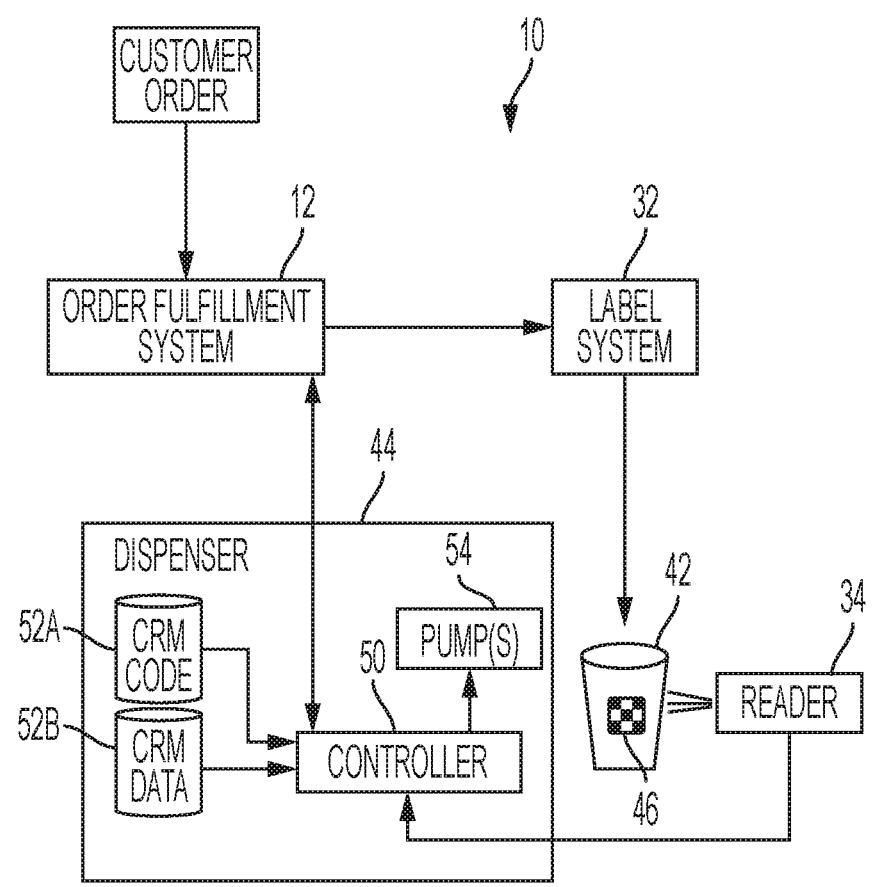
FIG. 3 depicts an additional example of use of the dispensing system.

FIG. 3 depicts another example of the use of the dispensing system 10. The dispensing system 10 includes the order fulfillment system 12. FIG. 3 provides another example of communication between the order fulfillment system and the dispenser 44. The order fulfillment system 12 provides the information for the customer order component, including the identification of the order component and the steps and constituents in the customer order component to the label system 32. The label system 32 creates an identifier 46 that encodes an identification of the customer order to which the order component is apart, the order component, and the steps and constituents of the order component. This information may all be encoded in the identifier 46 that is a two-dimensional bar code, for example, a quick response (QR) code. It will be recognized that other manners of encoding, including, but not limited to images or colors or patterns may also be used to encode this information. Thus, when the identifier 46 is affixed to the product package 42, for example with a sticker label or direct printing onto the product package 42, all of the information needed to complete that order component is provided thereon and thus travels with the product package 42.

In use of the dispensing system 10 of FIG. 3, the food service worker brings the product package with the identifier 46 affixed thereto to a reader 34 associated with a dispenser 44. While the reader 34 is depicted as a separate component, it will be recognized that in embodiments, the reader 34 may be a component of the dispenser 44, or may be a stand-alone device communicatively connected to the dispenser 44.

The dispenser 44 includes a controller 50. The controller 50 is exemplarily a microcontroller or microprocessor as would be recognized by a person of ordinary skill in the art and is communicatively connected, either by wired connections or wireless connections to sources of inputs/dispense information, for example the reader 34 which, after reading the order identifier 48 provides the information encoded therein to the controller 50.

The controller 50 may exemplarily be a central processing unit (CPU) and integrated memory in the form of a computer-readable medium. The controller 50 exemplarily includes a processor that accesses software or firmware in the form of computer-readable code stored on the non-transient computer-readable medium as either integrated memory or external memory. The processor of the CPU executes the computer-readable code as an instruction set to carry out the functions as described herein, including the receipt of inputs calculations and outputs as described herein.

As noted above, controller 50 is further communicatively connected to one or more non-transient computer-readable media (CRM) 52, and able to read and/or write information to/from the CRM 52. CRM 52 is distinguished based upon the content stored thereon for merely exemplary purposes as CRM code 52A and CRM data 52B. While the CRM 52 is depicted in FIG. 3 as CRM code 52A and CRM data 52B it will be recognized that the CRM 52 may encompass or may be implemented with one or more CRM to carry out the functions as described herein. In an exemplary embodiment, the CRM 52 includes computer memory upon which computer code embodying software or firmware is stored. Upon access and execution of the code by the controller 50, the controller 50 operates to send control signals, commands, and/or prompts to the components of the dispenser 44, including, but not limited to pumps 54 in order to carry out the functions of the dispenser 44 as disclosed herein. CRM data 52B exemplarily includes computer memory stored dispensing data which may exemplarily include information identifying the content of one or more specific reservoirs or containers of constituents for dispense located within dispenser 44, as well as the data used to interpret the encoded order identifier provided from the reader 34. In such embodiments, this may include but is not limited to a lookup table that includes interpretations of various information encoded in the order identifier such that the controller 50, upon execution of the associated CRM code 52A, may parse the steps or constituents encoded in the identifier 46.

As noted above, the controller 50 accesses and executes the computer-readable code stored at the CRM 52A to prompt and/or receive one or more inputs for operation of the dispenser 44. The controller 50 then further executes computer-readable code to output control signals to the pumps 54 or other mechanical or electromechanical valve, augers, or other actuators of the dispenser to provide the dispense. In exemplary embodiments, the order identifier may encode the dispense of one portion while the dispenser 44, through information stored at the CRM data 52B operates to determine with the controller 50 which constituents, reservoir, and a dispense duration and/or speed to achieve the dispense of a portion of that constituent. It will be recognized that different constituents may have different portion sizes or different dispense speeds or similar requirements which may be managed by the controller 50.

Using the same order from the embodiment described above with respect to FIG. 2, the identifier 446 exemplary encodes the identification of the customer, the order component, and that the order component requires one portion of vanilla flavoring, one portion of caramel flavoring, one portion of sugar, and two portions of creamer. If the dispenser 44 is a flavoring dispenser, the reader 34 reads the order identifier 48 and provides the information encoded in the order identifier to the controller 50. The control 50 interprets the encoded information, for example, by relying on the information stored in the CRM data 52B to interpret the encoded information as one portion of vanilla flavoring and one portion of caramel flavoring. The controller 50, executing computer-readable CRM code 52A provides control signals to the flavoring pumps 54 to complete this step of the preparation of the customer order. The process may continue in the manner as described above and as described in the context of the embodiment of FIG. 3 to complete the rest of the preparation of the order component.

Optionally, the controller 50 may be communicatively connected to the order fulfillment system 12 such that the order fulfillment system 12 may receive indications from the controller 50 of the dispenser 44 that the steps and/or constituents provided by the dispenser 44 have been completed. In this manner, the order fulfillment system 12 may track the progress and completion of the order component. In a related example, if the controller 50 is communicatively connected to the order fulfillment system, then the controller 50 can receive the instructions for the order from the order fulfillment system 12, based upon the read identifier 46. The reader 34 provides the information from the identifier 46 to the controller 50 which in turn uses communication with the order fulfillment system 12 to interpret the information from the identified into one or more tasks or operates of the dispenser 44.

Referring back to FIG. 1, through the restaurant IoT communication system 18, the order fulfillment system 12 may communicate and operate with any of the devices of the dispensing system 10 in the manners as exemplarily described with respect to FIGS. 2 and 3. As depicted in FIG. 1, each of the devices includes an associated reader 34, which operates to read the identifier associated with each product package as described in relation to the label system 32. The reader 34 and the associated device may communicate with the order fulfillment system 12 through the restaurant IoT system, for example, to carry out the functionality of the tracking or monitoring of the completion of steps or constituents of each customer order component. As explained above, in the event that a food service worker attempts to operate a device that has already been used in the preparation of the order component, the order fulfillment system 12 may provide a communication or notification to the foodservice worker, for example in an audible or visual communication indicating that the step or constituent has already been used in that order component and may provide a suggestion of a next step or constituent to continue preparation of the order component. This communication to the worker may be in a communication headset worn by the worker or may be visually on a graphical display of a user interface of the dispenser. In embodiments, the dispenser may also operate to make an audible alert as well. If the communication from the order fulfillment system includes the information, the graphical display of the dispenser may operate to provide a visual indication of the next step to complete the order or provide an indication of all of the steps in the preparation of the order and/or the steps that have already been completed.

The dispensing system 10 may further include a verification system 36 which may exemplarily include a reader 34 and a graphical display 35 may be used. The verification system 36 may be used by a food service worker in two exemplary instances, although more examples will be recognized by a person of ordinary skill in the art in view of the present disclosure. In a first example, the foodservice worker may get distracted and forget which step in the preparation of the customer order component that the foodservice worker must perform next. The food service worker can scan the identifier on the product package with the reader 34 of the verification system 36 and a controller of the verification system 36 communicates the information encoded in the scanned identifier exemplarily to the order fulfillment system 12 through the restaurant IoT communication system 18. The order fulfillment system 12 may communicate back to the controller of the verification system 36 through the restaurant IoT communication system 18 an indication of which steps or constituents have been performed for that identifier and which further steps or constituents are needed to complete that customer order component. All of this information may be presented on the graphical display 35 of the verification system 36. In another example, the foodservice worker may believe that the customer order component is complete and may scan the identifier on the product package with the reader 34 of the verification system 36. The verification system 36, through the controller thereof, performs the same check through communication with the order fulfillment system 12 and the controller of the verification system 36 operates the graphical display 35 to indicate to the foodservice worker if the customer order component is complete. In an exemplary embodiment, this may be a visual indication, for example, a green or red illumination, and if the customer order component is not complete, then a more detailed message of the remaining steps or constituents may be provided.

Related to the verification system 36, is an order assembly system 38. The order assembly system 38 similarly may include a reader 34 and a display 35 as with the verification system 36. The order assembly system 38 exemplarily includes a controller in communicative connection with the reader 34 and the graphical display 35 and facilitates assembly of the entire customer order, including all of the components which may have been prepared in the manners as described above. As noted previously, the order fulfillment system 12 identifies and tracks each of the customer order components as part of an entire customer order exemplarily received from the POS system 14. At the order assembly system 38, each of the completed customer order components has the identifier on the product package scanned by the reader 34 and the controller of the order assembly system 38 provides this identifier to the order fulfillment system 12 through the restaurant IoT communication system 18 to confirm that that order component is complete. It will be recognized that an embodiment of the order assembly system 38 may include and/or be combined with the verification system 36. The completed customer order components are held in a staging area and the customer order record and the order fulfillment system 12 is updated to reflect those customer order components that are completed. This information is provided through the restaurant IoT communication system 18 back to the controller of the order fulfillment system and this information provided on the graphical display 35 to provide a visual indication of the complete customer order components as well as the customer order components that still need to be completed in order to fulfill the entire customer order. Once each of the components of the customer order have been registered and verified by the order assembly system, the controller of the order assembly system may operate the graphical display 35 to provide an indication that the customer order is complete.

In additional examples, the verification system 36 and/or the order assembly system 38 may further be connected to or incorporate a customer notification system 40. The customer notification system exemplarily includes a controller, as described above, that receives an indication that the customer order is complete, or in the event of the customer order being a single item, for example, a custom flavored coffee beverage, for example from the verification system 36, the customer notification system 40 receives an indication of the customer identification associated with that completed customer order and announces the completion of that customer order. The announcement of the completed customer order may be carried out by the controller of the customer notification system 40 and exemplarily may be an audible or a visual notification. These notifications may include but are not limited to an audible or visual announcement of a customer name or a customer order number assigned to the customer and provided to the customer at the time that the order was placed.

Additional variations on the systems and methods as described herein will be recognized by a person of ordinary skill in the art in view of the present disclosure. Such variations may include the use of more or fewer components or steps while remaining within the scope of the present disclosure. Still further exemplary embodiments of the systems and methods as disclosed herein may be implemented as well. In one exemplary embodiment, the identifier as described above is "owned" or controlled by the customer, for example as part of a customer loyalty or other customer engagement program. In a non-limiting embodiment, the customer may purchase or be assigned to a reusable package, for example, a reusable cup that includes a unique identifier. In an exemplary embodiment, the customer may use an online or mobile interface to establish the order associated with that unique identifier. This order may be editable or changeable by the customer, for example through the online or mobile interface, or through an interactive computer or kiosk. Upon arriving at the restaurant, the customer may provide the reusable cup with the unique identifier to a food service worker. In a first example, the food service worker scans the unique identifier for entry into the POS system and to establish the charge due to the customer for the customer order. The food service worker may then use the unique identifier in the manners as described above to complete preparation of the customer order, for example by reading the unique identifier on the product package at the dispensers in the kitchen.

In another example, the unique identifier on the product package may further be associated with payment information, for example, a credit card or bank account. Upon arrival at the restaurant, the customer may provide the reusable product package with the unique identifier to the food service worker who reads the unique identifier at the dispensers of the kitchen to prepare the customer order in the reusable product package. By scanning the unique identifier, for example at a verification system or an order assembly system as described above, upon verification that the customer order is complete, the customers' account and/or payment information may be debited for the cost of the customer order and the reusable product package with the customer order is provided to the customer.

Figure 4:
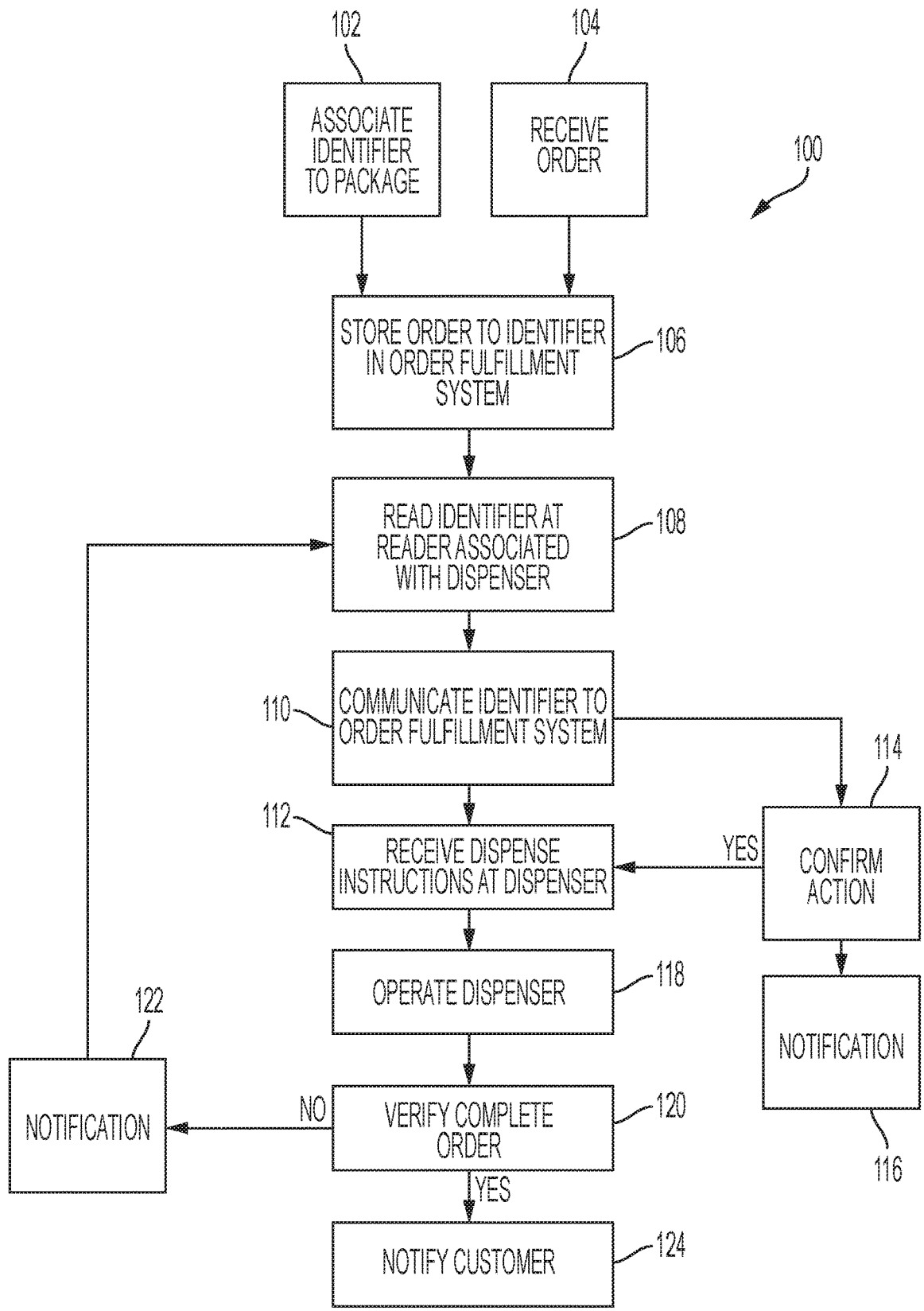
FIG. 4 is a flow chart that presents an example of a method of order fulfillment.

FIG. 4 is a flow chart that depicts an example of a method 100 of order fulfillment. The method 100 may be carried out using the systems as described in the examples provided with respect to FIGS. 1-3. Furthermore, it will be recognized that the method 100 may be initiated by a food service worker, or may be initiated by a customer, while the operation of the method 100 may remain the same. While the previous descriptions used an example of an order of a flavored coffee beverage, other orders may be completed with the method of order fulfillment, for example but not limited to, sandwiches, soups, salads, pastas, or desserts, all of which may be assembled by a series of automated stations or dispensers and controlled in the manners as described herein.

The method 100 includes the association of an identifier to a package at 102. The identifier comprises an alphanumeric code and may be encoded in an electronically perceptible manner including a bar code or an RFID tag. The identifier is affixed to the package and may be a disposable package or may be a reusable package. Reusable packages may include but are not limited to cups or bowls. Disposable packages may include but are not limited to wrappers, cups, or bowls.

At 104 a customer order is received. The customer order may be received through a point of sale register, an ordering kiosk, an internet web-page, or a mobile app. The customer order is received into the order fulfillment system. The customer order includes the specification of the food or beverage item. In one example, the customer order may specify each ingredient assembled into the ordered item, for example in an order of a custom salad, sandwich or beverage. In another example, the customer order identifies a menu item, and the order fulfillment system accesses a memory with the recipes of ingredients for each food item. The order fulfillment system thus can identify the ingredients assembled into the ordered item. While a single item order is used in the present example, the customer order may include a plurality of ordered food items, and each may be processed in a similar manner.

The receipt of the customer order at 104 may also include payment for the order. Once each of the ordered food items is received into the order fulfillment system, the total price for the items in the customer order can be determined and payment collected. Payment may be made by interaction with the foodservice worker or the ordering kiosk. In web or mobile-based applications, payment information linked to a credit card or bank account may be stored with the webpage or mobile app and payment made therewith.

At 106 the order fulfillment system stores the identifier associated with a package at 102 with an ordered item received at 104. In one example, the package is a disposable package and therefore the identifier is used with a single ordered item. A foodservice worker may take a disposable package from a supply either with a pre-affixed identifier or the foodservice worker will affix the identifier to the package (e.g. an adhesive label or an RFID tag). The order fulfillment system stores the alpha-numeric code of the identifier in association with the ordered item in a database of the order fulfillment system. In another example, the customer is in possession of a reusable package that includes an identifier affixed to it. Through a website or mobile application, the customer changes an ordered item associated with the identifier affixed to the customer's reusable package. The order fulfillment system is in communicative connection with the website or mobile application and stores the alpha-numeric code of the identifier in association with the updated ordered item in the database of the order fulfillment system. The customer may pay for the ordered food item at this time as well.

Next, at 108, the package with the identifier is brought into proximity with a reader associated with a dispenser of one or more ingredients for ordered items. The reader reads the identifier in an electronic manner to interpret the alpha-numeric code associated with the identifier. The electronic reading of the identifier may include visible light or IR spectrum light reading of a barcode, a digital image capture combined with computer image processing and interpretation, or electronic communication with an RFID tag of the identifier. In use, a plurality of dispensing devices with readers may be available to the foodservice worker for reading and dispensing of the ingredients of the ordered item. In another example of use, the customer may provide the reusable package to the foodservice worker. In a further example of use, one or more dispensing devices are made available for use by the customer, and the customer brings the reusable packaging to the dispensing devices.

The dispensing devices are communicatively connected to the order fulfillment system, for example through a restaurant IoT system local to the dispensing devices and exemplarily with a remotely located order fulfillment system, which may be communicatively connected to the restaurant IoT system through a wide area network or the internet. The read identifier (e.g. the code associated with the identifier) is provided through the communicative connection to the order fulfillment system at 110. The order fulfillment system interprets the code associated with the identifier by reference to the database that stores the ordered item in connection with the identifier. If the dispenser associated with the reader dispenses an ingredient required to complete the assembly of the ordered item, the order fulfillment system provides dispense instructions to the dispenser at 112.

As discussed in further detail herein, the order fulfillment system in communication with the dispenser tracks the dispenses of each of the ingredients for the ordered item. Optionally at 114, the order fulfillment system makes a determination to confirm that an operation of a dispenser is needed to complete assembly of the ordered item. If for example, the reader that scanned the identifier is associated with a dispenser that is not needed for the assembly of the ordered food item, then at 114 the dispenser action will not be confirmed and at 116 a notification is provided to inform the foodservice worker or the customer that that particular dispenser is not needed. For example, the notification from 116 may be an audible or visual notification presented by a user interface of the dispenser associated with the reader that scanned the identifier. Similarly, the order fulfillment system may track, as explained herein, which dispenser actions have already been performed in association with this identifier. Therefore, if that dispenser operation is already indicated at the order fulfillment system as have been performed, then at 114 the action is similarly not confirmed. The notification provided at 116 may additionally provide explanatory text or information to inform the foodservice worker or customer why the action was not confirmed.

If the dispenser receives dispense instructions at 112, then at 118, the dispenser operates to dispense the ingredient. In examples, the dispenser may operate to perform a single action or dispense or the dispenser may perform multiple dispenses. In a multiple dispense dispenser, a plurality of sauces may be dispensed, for example, ketchup and mustard. In another example, flavoring and creamer and sugar may be dispensed from a single machine. In a further example, multiple operations may be performed, for example, to dispense a bun, split a bun, and toast a bun. In other examples, each of these ingredients of the ordered item may be dispensed from separate dispensers. Depending upon the ingredient, the dispenser may use mechanically driven pumps, conveyors, paddles, on-demand slicers, or other actuators to dispense the ingredient.

After the dispenser operates to dispense the ingredient, then a check is made to determine if the assembly of the ordered item is complete at 120. As previously noted, the dispenser provides a communication back to the order fulfillment system indicating that the dispenser has dispensed the instructed ingredient. The order fulfillment system may track the order assembly progression noting that the ingredient has been dispensed. The order fulfillment system also checks to determine if all of the ingredients for the ordered item have been dispensed, if not, then at 122 a notification is provided indicating a next or remaining ingredient to complete the ordered item. This notification may be audibly presented or visually presented to the customer or the foodservice worker assembling the ordered item. The customer or foodservice worker then brings the package to a next required dispenser and returns to 108 where the identifier is read by the associated reader.

If the order is verified to be complete at 120, then the customer may receive a notification at 124. This notification may be a visual notification on a public display screen in a restaurant, or it may be an in-app notification on the customer's mobile device. The notification may also come in the form of a text message to the customer's mobile device. At this time, a deposit account or credit card associated by the customer to the identifier may be charged or debited for the cost of the ordered item.

Exemplary embodiments as described herein have been described in the context of implementation using reader devices and/or graphical display devices, exemplarily associated with each of the dispensers of the kitchen. In additional exemplary embodiments, the readers and/or displays may be provided in the context of a digital reality system in which one or more wearable devices, worn by each of the food service workers, interact with physical items in the environment about the worker and operate to provide projection of digital information in association with the observed physical environment to carry out the systems and methods as disclosed herein. In such exemplary embodiments, the food service workers may wear a digital reality (DR) headset with one or more cameras to capture images of the environment surrounding the food service worker. By way of the images captured by these cameras, the product packages and/or the identifiers as described herein may be identified and/or read through image processing and object detection. In an exemplary embodiment, the identifiers as provided herein may be read by image recognition either of the barcode, two-dimensional barcode, encoded image, colors, or by optical character recognition of a textual and/or numerical description of the customer order and steps or constituents to complete the customer order provided on the product package.

This information may be used to provide visual presentations, communications, and notifications to various food service workers and may provide different presentations to different food service workers. In an exemplary embodiment, a food service worker may be presented with graphical DR indications of the product packages for the customer order component for which that food service worker is assigned. The graphical indications may provide a visual indication whether a customer order component is complete or incomplete, for example by a circle or shape and/or color relative to the identified product package, while in another embodiment an overlay with a shape and/or color indication of component completion may be provided relative to the product package. In still further exemplary embodiments, a textual list of remaining steps or constituents or dispensers to be used/performed may be provided relative to the product package to assist the food service worker in identifying remaining actions to be taken to complete the customer order component. Exemplarily, a food service manager may be presented with a different presentation of graphical DR information. In one such example, the manager may be provided with a graphical indication of the completion status of each customer order component, for example with a graphical symbol or color relative to each product package, across all of the customer order components and product packages assigned to all of the other food service workers, while the manager has the option to have this information presented in a more simplified view which may include less detail, including the remaining steps, constituents, or devices associated with completion of each of the customer order components. In this manner, the manager may view the entire kitchen to see the completion status of each of the customer order components. It will be recognized that in the DR embodiments as described herein, that such gathering and display of information may be done so by way of communicative connection between the associated DR headsets and the order fulfillment system 12, for example through the restaurant IoT system 18 as previously described.

In a still further exemplary embodiment, food service workers may be additionally equipped with a second wearable device, for example, a glove, wristband, or bracelet. In such an exemplary embodiment, the reader may be incorporated into the secondary wearable device, for example, an embodiment wherein the identifiers are provided as RFID tags associated with each of the product packages, in which case the secondary wearable device includes an RFID tag reader. However, other embodiments of identifiers and readers may be incorporated into such embodiments, including, but not limited to, barcode readers and image capture and recognition systems as well. In such embodiments, the secondary wearable device performs the function of reading the identifiers associated with each product package and the secondary wearable device may be communicatively connected, for example through the restaurant IoT communication system 18 to the order fulfillment system 12 to provide these identifiers to the order fulfillment system 12. The order fulfillment system 12 then operates to exemplarily provide the identifier information to associated devices and/or displays, including a DR headset worn by the foodservice worker as previously described.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of foodservice customer order fulfillment, the method comprising:
   associating an identifier to a package;
   receiving a customer order comprising an ordered item at an order fulfillment system, wherein the ordered item comprises at least a first ingredient and a second ingredient;
   storing an indication of the ordered item in association to the identifier in the order fulfillment system, wherein the stored indication of the ordered item comprises an identification of the first ingredient and the second ingredient;
   reading the identifier at a first reader associated with a first dispenser configured to dispense the first ingredient;
   communicating the identifier to the order fulfillment system;

receiving a first dispense instruction from the order fulfillment system at the first dispenser configured to dispense the first ingredient;
operating the first dispenser configured to dispense the first ingredient according to the first dispense instruction to dispense the first ingredient;
communicating a first confirmation, indicative of the dispense of the first ingredient, to the order fulfillment system from the first dispenser configured to dispense the first ingredient;
subsequently reading the identifier at a second reader associated with a second dispenser configured to dispense the second ingredient;
communicating the identifier to the order fulfillment system;
receiving a second dispense instruction from the order fulfillment system at the second dispenser configured to dispense the second ingredient;
operating the second dispenser configured to dispense the second ingredient according to the second dispense instruction to dispense the second ingredient;
communicating a second confirmation, indicative of the dispense of the second ingredient, to the order fulfillment system from the second dispenser configured to dispense the second ingredient; and
tracking a completion of assembly of the ordered item with the first confirmation and the second confirmation against the identification of the first ingredient and the second ingredient of the customer order in the order fulfillment system; and
verifying at the order fulfillment system that assembly of the ordered item is complete when the first and second ingredients are confirmed with received confirmations which comprise the first confirmation and the second confirmation.

2. The method of claim 1, further comprising:
storing the first indication of the dispensed first ingredient at the order fulfillment system.

3. The method of claim 1, further comprising determining if the second ingredient of the second dispenser associated with the second reader has dispensed in the assembly of the ordered item by referencing the tracked completion of the ordered item assembly, wherein upon determining the second ingredient has not been dispensed, the order fulfillment system provides the second dispense instruction to the second dispenser configured to dispense the second ingredient.

4. The method of claim 1 further comprising determining if the second ingredient of the second dispenser associated with the second reader has dispensed in the assembly of the ordered item by referencing the tracked completion of the ordered item assembly, wherein upon determining the second ingredient has already been dispensed, producing a perceptible notification.

5. The method of claim 1, wherein tracking the completion of the ordered item assembly comprises updating a customer order record with the first confirmation and the second confirmation.

6. The method of claim 1, wherein verifying that assembly of the ordered item is complete further comprises, upon determining the ordered item is not complete, producing a perceptible notification of a next remaining ingredient to be dispensed to complete the assembly of the ordered item.

7. The method of claim 1, wherein verifying that assembly of the ordered item is complete further comprises, upon determining the ordered item is complete, producing a perceptible notification to a customer that the ordered item is complete.

8. The method of claim 7, further comprising obtaining payment for the ordered item from the customer.

9. The method of claim 1, wherein the received customer order identifies the ordered item and further comprising identifying the plurality of ingredients of the ordered item with the order fulfillment system.

10. The method of claim 1, wherein the customer order is received from a customer through a mobile device operated by the customer in communicative connection to the order fulfillment system.

11. The method of claim 10, wherein the package is a reusable package with an identifier and further comprising receiving a change to the ordered item associated with the identifier stored at the order fulfillment system.

12. The method of claim 1, wherein the identifier is represented on the package as a quick response code.

13. The method of claim 1, wherein the identifier is represented on the package as an RFID tag.

14. The method of claim 1, wherein the first dispenser is configured to dispense at least one of creamer, sugar, flavoring, sauces, baked goods, or protein.

15. The method of claim 1, wherein the first dispenser and the second dispenser are each a part of a plurality of dispensers within a dispensing system, wherein the first dispenser is configured to dispense a different ingredient than the second dispenser.

16. The method of claim 15, wherein the dispensing system comprises at least one of a sauce dispenser, a produce dispenser, a beverage component dispenser, or a toasted baked good dispenser.

17. The method of claim 1, wherein the ordered item is a first ordered item and the identifier is a first identifier and the received customer order comprises a second ordered item comprising the first ingredient and the second ingredient, and wherein the method further comprises:
associating a second identifier to a second package;
storing an indication of the second ordered item in association to the second identifier in the order fulfillment system, wherein the stored indication of the second ordered item comprises an identification of the first ingredient and the second ingredient;
reading the second identifier at the first reader associated with the first dispenser;
communicating the second identifier to the order fulfillment system;
receiving a third dispense instruction at the first dispenser from the order fulfillment system;
operating the first dispenser according to the third dispense instruction to dispense the first ingredient;
communicating a third confirmation, indicative of the dispense of the first ingredient, to the order fulfillment system from the first dispenser;
subsequently reading the second identifier at the second reader associated with the second dispenser;
communicating the second identifier to the order fulfillment system;
receiving a fourth dispense instruction at the second dispenser from the order fulfillment system;
operating the second dispenser according to the fourth dispense instruction to dispense the second ingredient of the plurality of ingredients;
communicating a fourth confirmation, indicative of the dispense of the second ingredient, to the order fulfillment system from the second dispenser; tracking a completion of a second ordered item assembly; and tracking a completion of assembly of the customer order against the indications of the first ordered item and the second ordered item stored in the order fulfillment system; and verifying, at the order fulfillment system, that assembly of the customer order is complete by reference to the received first and second confirmations of the tracked completion of the first ordered item assembly and received third and fourth confirmations of the tracked completion of the second order item assembly.

18. The method of claim 1, wherein the first dispenser is configured to dispense protein, the first ingredient being a protein and the second dispenser is configured to dispense a sauce, the second ingredient being a sauce.

19. The method of claim 1, wherein the first dispenser is configured to dispense a first of creamer, flavoring, or sugar and the second dispenser is configured to dispense a second of creamer, flavoring, or sugar, wherein the first ingredient is a first of creamer, flavoring, and sugar and the second ingredient is a second of creamer, flavoring, and sugar.

20. The method of claim 1, wherein after the first confirmation is communicated to the order fulfillment system and the first reader subsequently reads the identifier, further comprising:

providing an indication that the ordered item already includes the first ingredient; and providing a perceptible notification of the second ingredient to complete assembly of the ordered item.

\* \* \* \* \*